United States Patent
Mangal et al.

(10) Patent No.: US 8,060,612 B1
(45) Date of Patent: *Nov. 15, 2011

(54) NAI (NETWORK ACCESS IDENTIFIER) EMBEDDING

(75) Inventors: Manish Mangal, Overland Park, KS (US); Jeremy R. Breau, Kansas City, MO (US); Frederick C. Rogers, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1146 days.

This patent is subject to a terminal disclaimer.

(21) Appl. No.: 11/734,570

(22) Filed: Apr. 12, 2007

Related U.S. Application Data

(60) Provisional application No. 60/853,306, filed on Sep. 29, 2006, provisional application No. 60/853,307, filed on Sep. 29, 2006, provisional application No. 60/864,340, filed on Nov. 3, 2006.

(51) Int. Cl.
  G06F 15/173 (2006.01)
  H04W 4/00 (2009.01)
(52) U.S. Cl. .......................... 709/226; 455/433; 370/328
(58) Field of Classification Search .................. 709/206, 709/226, 229; 370/328, 400; 455/432.3, 455/433
  See application file for complete search history.

(56) References Cited

U.S. PATENT DOCUMENTS

| | | | |
|---|---|---|---|
| 6,785,256 B2 * | 8/2004 | O'Neill .......................... 370/338 |
| 6,988,146 B1 * | 1/2006 | Magret et al. .................. 709/238 |
| 7,130,629 B1 | 10/2006 | Leung et al. |
| 7,292,592 B2 | 11/2007 | Rune |
| 7,356,137 B1 | 4/2008 | Burg et al. |
| 7,551,926 B2 | 6/2009 | Rune |
| 7,561,579 B2 * | 7/2009 | Madour et al. ........... 370/395.21 |
| 7,730,524 B2 | 6/2010 | Patel et al. |
| 7,881,288 B2 * | 2/2011 | Noldus et al. .................. 370/354 |
| 2002/0110104 A1 | 8/2002 | Surdila et al. |
| 2003/0026245 A1 | 2/2003 | Ejzak |
| 2003/0133421 A1 | 7/2003 | Sundar et al. |
| 2003/0229787 A1 | 12/2003 | Gabor |
| 2004/0225895 A1 | 11/2004 | Mukherjee et al. |
| 2005/0009520 A1 | 1/2005 | Herrero et al. |
| 2005/0210261 A1 | 9/2005 | Kamperman et al. |
| 2006/0005185 A1 | 1/2006 | Nguyen |
| 2006/0077924 A1 | 4/2006 | Rune |
| 2006/0077926 A1 | 4/2006 | Rune |
| 2006/0120287 A1 | 6/2006 | Foti et al. |
| 2006/0123469 A1 | 6/2006 | Lee et al. |
| 2006/0143703 A1 | 6/2006 | Hopen et al. |
| 2006/0156390 A1 | 7/2006 | Baugher |

(Continued)

OTHER PUBLICATIONS

Non-Final Office Action; mailed Apr. 1, 2010; U.S. Appl. No. 11/734,568, filed Apr. 12, 2007; First Named Inventor: Manish Mangal; Confirmation No. 1288.

(Continued)

*Primary Examiner* — Yemane Mesfin

(57) ABSTRACT

Ways for embedding multiple network-access identifiers (NAIs) into a single string are provided. An illustrative embodiment includes providing a multiple-string-format (MSF) indicator that indicates that an instant string a includes data that, when ultimately deconstructed, indicate multiple Network Access Identifiers (NAIs), providing two or more usernames and realm identifiers separated by one or more delimiters that indicate the start of a new user name or realm identifier, providing a domain delimiter that indicates a start of a domain name, providing a domain name, concatenating into a single string various indicators, and providing for the communication of the single string to a receiving device for processing.

18 Claims, 10 Drawing Sheets

U.S. PATENT DOCUMENTS

| | | |
|---|---|---|
| 2006/0279628 A1 | 12/2006 | Fleming |
| 2007/0022200 A1 | 1/2007 | Benkert et al. |
| 2007/0053361 A1 | 3/2007 | Chen et al. |
| 2007/0060097 A1 | 3/2007 | Edge et al. |
| 2007/0072605 A1 | 3/2007 | Poczo et al. |
| 2007/0094691 A1 | 4/2007 | Gazdzinski et al. |
| 2007/0180505 A1 | 8/2007 | Patel et al. |
| 2008/0090513 A1 | 4/2008 | Collins et al. |
| 2008/0232352 A1 | 9/2008 | Terrill et al. |
| 2009/0129386 A1 | 5/2009 | Rune |

OTHER PUBLICATIONS

Final Office Action; mailed Mar. 31, 2010; U.S. Appl. No. 11/734,578, filed Apr. 12, 2007; First Named Inventor: Manish Mangal; Confirmation No. 1306.

Non-Final Office Action; mailed Oct. 5, 2009; U.S. Appl. No. 11/734,578; 16 pages.

Non-Final Office Action; mailed Oct. 5, 2009; U.S. Appl. No. 11/734,568; 17 pages.

Final Office Action, U.S. Appl. No. 11/734,581, mail date: Nov. 24, 2010, 26 pages.

Non-final Office Action; mailed Jun. 9, 2010; U.S. Appl. No. 11/734,575.

Non-final Office Action; mailed Jun. 10, 2010; U.S. Appl. No. 11/734,581.

NFOA Mail Date Oct. 5, 2010 U.S. Appl. No. 11/734,568, filed Apr. 12, 2007.

Notice of Allowance and Fee(s) Due, U.S. Appl. No. 11/734,575, filed Apr. 12, 2007, Date Mailed: Nov. 26, 2010.

Final OA mailed Mar. 21, 2011, U.S. Appl. No. 11/734,568.

\* cited by examiner

JOHN.DOE@SPRINT.COM
└─810─┘└──812──┘

*FIG. 8A. – Prior Art NAI Format*

JOHN.DOE##ALPHA.COM##BETA.COM@SPRINT.COM

- 850A: ## — INDICATES EMBEDDED NAI FORMAT
- 850B: JOHN.DOE — EMBEDDED USERNAME
- 850C: ## — REALM DELIMITER
- 850D: ALPHA.COM — FIRST EMBEDDED REALM IDENTIFIER
- 850E: ## — REALM DELIMITER
- 850F: BETA.COM — SECOND EMBEDDED REALM
- 850G: @ — DOMAIN DELIMITER
- 852: SPRINT.COM — DOMAIN NAME

REPRESENTS THESE NAIS:

- 852: JOHN.DOE@ALPHA.COM
- 854: JOHN.DOE@BETA.COM
- 856: JOHN.DOE@SPRINT.COM

*FIG. 8B.*

NAI (NETWORK ACCESS IDENTIFIER) EMBEDDING

CROSS-REFERENCE TO RELATED APPLICATIONS

This application claims the benefit of three U.S. Provisional Applications (all of which are incorporated by reference herein): 1) Application No. 60/864,340 filed Nov. 3, 2006; 2) Application No. 60/853,307 having a filing date of Sep. 29, 2006, entitled "CASCADING NETWORK LOGIN"; and 3) Application No. 60/853,306 also having a filing date of Sep. 29, 2006, entitled "MULTIDOMAIN, INTERCARRIER, NETWORK-TO-NETWORK INTERFACE".

Moreover, Applicants wish to call the Office's attention to the fact that the five following Applications (one of which is this one), filed on even date herewith, include related disclosed subject matter: 1) "DYNAMIC CSCF ASSIGNMENT"; 2) "NAI (NETWORK ACCESS IDENTIFIER) EMBEDDING"; 3) "EXTRACTING EMBEDDED NAIS (NETWORK ACCESS IDENTIFIERS)"; 4) "MULTIDOMAIN, INTERCARRIER, NETWORK-TO-NETWORK INTERFACE"; and 5) "CASCADING NETWORK LOGIN". The subject matter of each of these documents is expressly incorporated by reference herein.

BACKGROUND

Absent embodiments of the present invention, devices need to use the home network that they are associated with to access services in an IMS environment. This is inefficient when customers are geographically or communicatively distant from their home network, but within a closer proximity to another carrier's network. For example, a U.S. customer visiting China may have to have his call backhauled to the U.S. to access various service offerings. Moreover, current methods do not allow for embedding NAIs into a single string (and hence, require at least increased overhead and processing of multiple individual strings that each describe only a single NAI) nor extracting the same in an IMS setting.

SUMMARY

The present invention is defined by the claims below. Embodiments of the present invention address at least the above issues by providing, among other things, technologies for sharing infrastructure resources across networks in different domains without having to rely only a home network to satisfy service requests of customers, dynamically assigning CSCF control operations, embedding multiple NAIs into a single request, and extracting the same. Embodiments of the present invention have several practical applications in the technical arts including allowing a customer of a company in a first domain to be able to directly utilize the services of another domain, and to reduce the amount of profile information that needs to be stored on communications devices.

A first illustrative aspect, media instructions facilitate a method of embedding multiple network-access identifiers (NAIs) into a single string. An illustrative method includes providing a multiple-string-format (MSF) indicator that indicates that an instant string a includes data that, when ultimately deconstructed, indicate multiple Network Access Identifiers (NAIs), providing two or more usernames and realm identifiers separated by one or more delimiters that indicate the start of a new user name or realm identifier, providing a domain delimiter that indicates a start of a domain name, providing a domain name, concatenating into a single string, the MSF indicator, the two or more usernames and realm identifiers, the domain delimiter, and the domain name, and providing for the communication of the single string to a receiving device for processing.

In a second illustrative aspect, computer-storage media having a data structure stored therein is provided. The data structure includes a first username, a first realm delimiter that indicates a presence of a first realm associated with the first username, a realm indicator associated with the first username, a second realm delimiter that indicates a presence of a second realm associated with the first username, and a second realm that is also associated with the username.

In a third illustrative aspect, media instructions facilitate a method of embedding multiple network-access identifiers (NAIs) into a single string, indicating that a current or upcoming string includes data that indicates multiple NAIs, communicating the string that includes data that indicates multiple NAIs associated with a user identifier.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 8A depicts a prior-art NAI format;

FIG. 8B depicts an illustrative embodiment of an alternative NAI format, a single string, an NAI string, that includes data capable of identifying multiple NAIs.

DETAILED DESCRIPTION

Figure 1:
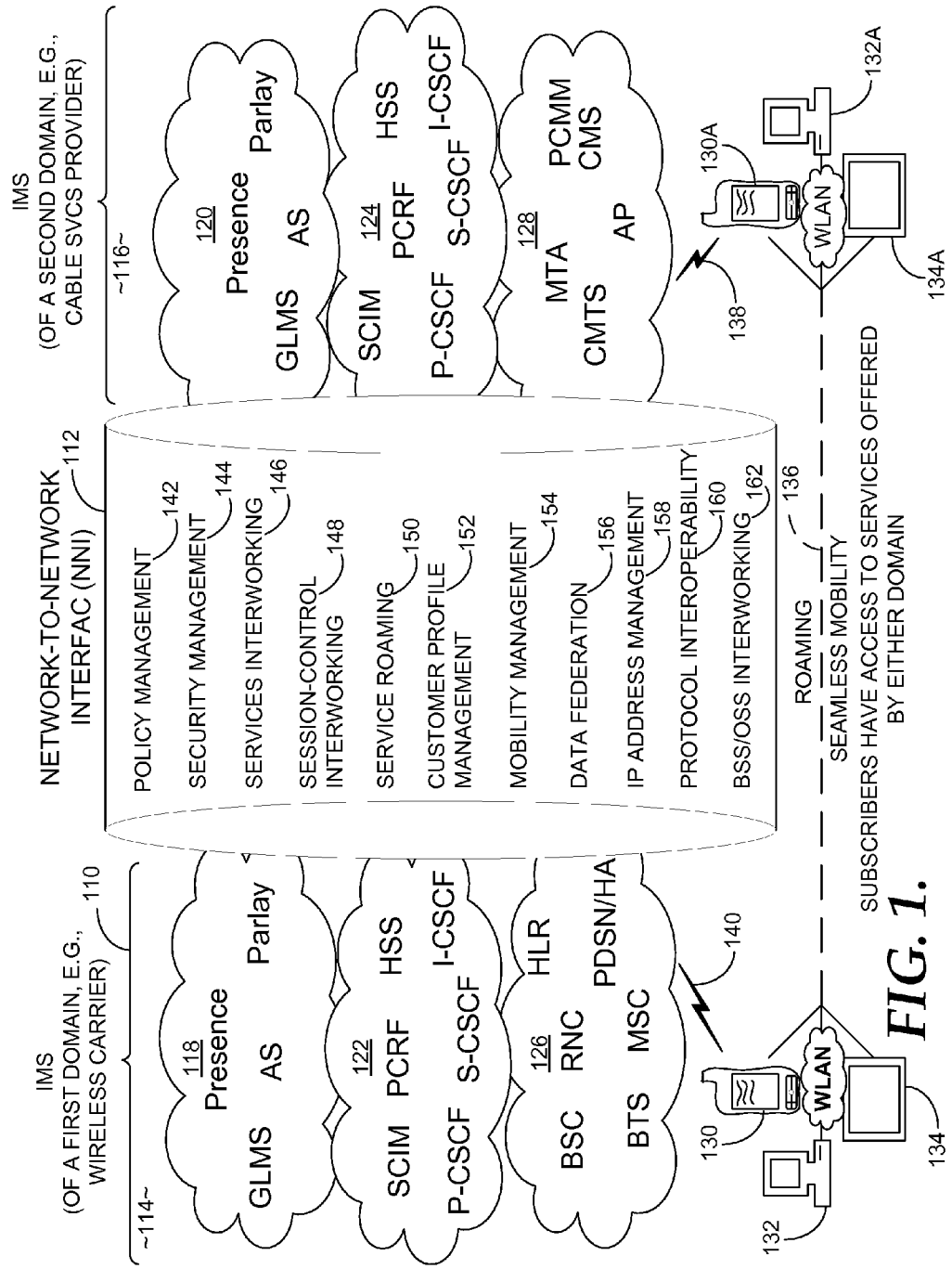
FIG. 1 is a block diagram depicting an illustrative operating environment suitable for practicing an embodiment of the present invention.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AP Application Protocol
AS Application Server
BSC Base Station Controller
BSS Business Support Systems (or Services)
BTS Base Transceiver Station
CATV Cable TV
CDMA Code Division Multiple Access
CD-ROM Compact Disk Read Only Memory
CMS Call Management Server
CMTS Cable Modem Termination System
CSCF Call Session Control Function
DHCP Dynamic Host Configuration Protocol
DNS Domain Name Server
DVD Digital Versatile Discs
EEPROM Electrically Erasable Programmable Read Only Memory
FQDM Fully Qualified Domain Name
GLMS Group List Management Server
GSM Global System for Mobile Communications
GPRS General Packet Radio Service
HLR Home Location Register
HSS Home Subscriber Server
I-CSCF Interrogating Call Session Control Function
IFC Initial Filter Criteria
IMS IP Multimedia Subsystem
IPR IP Rights
LAN Local Access Network
MMS Multimedia Messaging Service
MSC Mobile Switching Center
MTA Message Transfer Architecture
NAI Network Access Identifier
NNI Network-Node Interface
OSS Operational Support Systems (or Services)
PCMM Packet Cable Multi Media
PCRF Policy and Charging Resource Function
P-CSCF Proxy Call Session Control Function
PDA Personal Digital Assistant
PDSN/HA Packet Data Serving Node/Home Agent
P/I-CSCF Proxy/Interrogating Call Session Control Function
PRL Preferred Roaming List
RAM Random Access Memory
RNC Radio Network Controller
ROM Read Only Memory
SCIM Service Capability Interaction Manager
S-CSCF Serving Call Session Control Function
SIP Session Initiation Protocol
SS Subscriber Server
TFT Traffic Filter Template
TDMA Time Division Multiple Access
VCC Voice Call Continuity
VoIP Voice over Internet Packet
VOP Voice Over Packet Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

Embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. An exemplary modulated data signal includes a carrier wave or other transport mechanism. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

FIG. 1 depicts an illustrative environment 110 where services have the technical capability to be exhibit shared relationships with each other even though services are being provided by different (as opposed to the same) carriers. A converged services environment 110 allows services in either domain to be provided to a customer without the customer knowing that such services are being provided by different entities (or the same entities in different domains). In an illustrative example, a user watching a certain television channel, say PBS, may be in the middle of watching a show on the television but can now have that show sent to his or her mobile device (phone, PDA, etc.) to finish after they have left the living room (while taking a taxi cab to the airport for example).

In one embodiment, the architecture described herein leverages IMS, or IP Multimedia Subsystem technology, taking its principles further. An IP Multimedia Subsystem (IMS) network is a standardized architecture for telecom operators who want to provide mobile, fixed multimedia, and other services. It supports a Voice-over-Packet (VoP) implementation based on a 3GPP standardized implementation of SIP that can run over the standard Internet Protocol (IP). Existing phone systems (both packet-switched and circuit-switched) can be supported.

IMS uses open standard IP protocols, defined by the IETF (Internet Engineering Task Force). A multimedia session between two IMS users, between an IMS user and a user on the Internet, and between two users on the Internet is established using the same protocol. Moreover, the interfaces for service developers can also be based on IP protocols. This is why IMS can facilitate merging the Internet, CATV, cellular (mobile) communications, and more.

Although IMS allows some convergence of services (such as voice messaging and voice), it is constrained in that it can facilitate such services offered only by a single provider. Thus, a first carrier may use IMS to send television to a mobile phone using IMS only if that television stream is provided by the first carrier, which is a very different scenario than, say, the first carrier allowing a subscriber to watch television programming provided by a second carrier, which is what an embodiment of the present invention allows.

Thus, IMS has been defined as if all the services are residing in one environment under one ownership and to be delivered to endpoints associated with that environment. Mobile carriers control their mobile end points (handheld devices), but when the customer enters into the cable environment (his or her home for example), they lose control over that customer because digital phone and entertainment services are all provided by an entity in a different domain, such as a cable provider.

One applicable environment suitable for practicing an embodiment of the present invention includes that where each entity has their own IMS structure. An embodiment of the present invention allows the two networks to interwork so that services historically delivered only via their respective IMS infrastructures can be shared in a way that the services can be collectively and transparently delivered to customers.

In this way, an appropriately equipped handheld device can utilize wireless technologies (such as CDMA, TDMA, GPRS, GSM, etc.) when away from home or other localized areas, but use wireless LAN technologies when in the vicinity of a wireless LAN (e.g., airports, homes, bookstores, and wherever else a WiFi or similar connection can be utilized).

Returning to FIG. 1, a network-to-network interface (NNI) 112 exposes the resources of a first carrier in a first domain 114 with those of a second carrier in a second domain 116. Various clouds are shown that illustratively represent various services offered by each carrier. By way of example, cloud 118 includes technologies related to determining and utilizing presence information. Presence information relates to information associated with a geographic location or designated status of a person. One example includes emoticons (sometimes called "smiley faces") that indicate whether people are away from their computer, or sleeping, or otherwise unavailable. Presence information can also convey actual geographic location of users, via the location of their handheld devices. This is useful in providing location-based services and, in some scenarios, can be used to facilitate or help facilitate session hand off when one transitions from home to beyond.

Illustrative components that may be employed to provide presence information includes a Group List Management Server (GLMS), a Parlay or similar client (also know as a Parlay X Web service), or other Application Server (AS). Similar presence information is shown in cloud 120 associated with second domain 116.

Cloud 122 also depicts illustrative components that might be included, such as a Service Capability Interaction Manager (SCIM), a Policy and Charging Resource Function (PCRF), a Home Subscriber Server (HSS), a Proxy Call Session Control Function (P-CSCF), a Serving Call Session Control Function (S-CSCF), and an Interrogating Call Session Control Function (I-CSCF). These components are illustratively shown also in cloud 124, associated with second domain 116.

Cloud 126 depicts illustrative communications components including a Base Station Controller (BSC), a Radio Network Controller (RNC), a Home Location Register (HLR), a Base Transceiver Station (BTS), a Mobile Switching Center (MSC), and a Packet Data Serving Node/Home Agent (PDSN/HA).

In sister cloud 128, the following illustrative communications components are shown: a Cable Modem Termination System (CMTS), a Message Transfer Architecture (MTA), a Packet Cable Multi Media component (PCMM), and a Call Management Server (CMS). Of course there may actually be many instances of such components.

NNI 112 makes possible the sharing of network resources across networks to various devices, such as a mobile device (handheld, PDA, and the like) 130, a computer 132, and a television or equivalent 134. Roaming is thus possible, and can be done so seamlessly and transparent to a user, as indicated by line 136. Accordingly devices 130A, 132A, and 134A may be the same devices as 130, 132, and 134, but in a different location or operating using a different technology. For example, communications link 138 may be a wireless LAN link (e.g., one that comports with a variation of the 802.11 standard, such as 802.11a, 802.11b, 802.11g, 802.11n, or others), whereas communication link 140 may be a mobile wireless technology (e.g., CDMA, TDMA, GPRS, GSMC, etc.). This aspect is also explained in connection with FIG. 2 below.

NNI 112 may include various components that facilitate interoperability between the technologies of first domain 114 and those of second domain 116. Due to space consideration on the drawing, FIG. 1 includes only words inside of NNI 112, but it is to be understood that each title describes a component that facilitates an aspect of interoperability functionality. The illustrative components include a policy-management component 142, a security-management component 144, a services-interworking component 146, a session-control-interworking component 148, a service-roaming component 150, a customer-profile-management component 152, a mobility-management component 154, a data-federation component 156, an IP address management component 158, a protocol-interoperability component 160, and a BSS/OSS (Business Support Systems/Operational Support Systems) interworking component 162.

Some of the aforementioned components may be implemented in hardware, software, or a combination of the same. They may be composed of several constituent components. Moreover, others may attribute different names to the same components. Thus, descriptive adjectives have been provided that indicate the functions that these various components carry out. Additional explanations of the same follow.

Policy-management component 142 enables policies to be shared among two networks or more networks. Throughout this disclosure, explanation is generally provided with respect to two networks. But the same teachings described herein can be applied to environments with more than two networks so that the resources of as many networks as are desired can be shared. But so as to not obscure the present invention, references to two networks will be made, simplifying an explanation of but one embodiment of the present invention or an aspect thereof. Both IMS domains 114 and 116 include a policy-management architecture in one embodiment that would include a master-policy server and multiple distributed slave policy managers.

Accordingly, the policies applicable to a subscriber associated with a first domain, such as domain 114 can be commensurately effective in a second domain such as domain 116. The part of NNI 112 between the two network's master-policy managers may allow policy information about a customer to be shared between two networks in one embodiment. This sharing may include static as well as dynamic information. Static information may be shared at the time of user registration in one embodiment. Illustrative examples of static information include a user ID (in one embodiment, it could vary in others), services the user subscribes to, etc. Dynamic information may be shared at the time of service initiation in one embodiment. Illustrative examples of dynamic information include information that changes. This could include "cookie" type information but a better example may be presence information as services may change based on location. Dynamic information may also include things such as the flow type (VoIP=high QoS, Internet traffic=best effort, etc.). The user profile may over-write a dynamic parameter with a static value if the user profile changes (i.e., raises QoS to Gold level regardless of traffic flow type) a dynamic parameter to a predefined value.

Security-management 144 provides security interfaces between the networks so that the specific network topologies may be hidden from each other if desired. Although certain aspects or resources of each network may be desired to be shared as though the networks are one network, in the situations where, in fact, they are not one network, it may be desirable to keep other aspects of each network private.

Services-interworking component 146 allows services from multiple domains to be delivered to a customer irrespective of which domain they are connected to at any given point. It allows the available services to be published to a customer's device (e.g., one or more of 130, 132, or 134). In one embodiment, the serving IMS network has the responsibility to poll the other IMS domains to discover what services are available across all the IMS domains.

Session-control-interworking component 148 allows the serving network domain (where the user is at any given point) to control the sessions and services for the customer. This is an advance over the current state of the art, wherein current IMS architecture allows only the home network to control sessions and services.

Service-roaming component 150 facilitates cross-domain roaming. In this situation, a customer roams from one IMS domain (such as 114) to others (such as 116), triggering new registration to the other network as the case may be. The second network 116 then interacts with the home network 114 to gather customer information such as profile, policy, subscribed services, etc. Through the interfaces with other IMS domains, such services may be delivered.

Customer-profile-management component 152 manages sharing of information of customers' profiles across multiple networks. In one embodiment, customer-profile data may be stored as an HSS (Home Subscriber Server) network element (see reference numeral 214, FIG. 2 for example). When the customer is first provisioned, the subscriber information is provisioned in the HSS, such as 214. In the multidomain architecture according to an embodiment of the present invention, when the subscriber is provisioned in one operator's HSS 214, the interface between HSSs (e.g., between HSS 214 and HSS 216) allows that provisioning information to be passed along to other HSSs so that a subscriber is provisioned to multiple IMS networks at the same time. Depending on the amount of privacy desired, a roaming partner may not necessarily receive the entire user profile in some embodiments. But some portion of the profile (or domain) information may be shared in order to allow users to authenticate in visited domains as part of the roaming agreement is such is desired.

Seamless-mobility-management component 154 allows the user to move from one network to the other network while maintaining services without service interruption. Applicable technologies for such handoff and maintenance include voice, chat, messaging, video, and more. A Voice Call Continuity (VCC) server (not shown) can maintain call state when the user moves from one access network 114 to the other access network 116. To facilitate such continuity in a multi-domain environment, multiple VCC implementations (for example, one per each domain) can be employed in one embodiment. As the user moves from one domain 114 to the other domain 116, the visiting IMS network 116 would connect that session back to the originating IMS network 114 while the active call is ongoing. When the user enters an idle state (e.g., not in an active call), the client in the device would change the VCC server to the new IMS network 116.

Data federation component 156 facilitates operations associated with data federation, such as integrating diverse data in an enterprise or other environment. Other examples include resolving issues associated with transparency, heterogeneity, autonomy, and extensibility. Data federation component 156 allows intra-session inter-working of services and functions residing in multiple independent IMS infrastructures.

IP-address-management component 158 manages IP addresses across domains. In a multidomain environment, the IP address is assigned by the network that the user is connected to at any given point in one embodiment. As users move from one network 114 to another network 116, they may need to or it may be desirable to change their respective IP addresses. The IP address may be bound to several services that the customer is receiving. But changing an IP address could mean that the user would need to reregister with the network, causing a service interruption. IP-address-management component 158 helps communicate address-information change in a way that each network can still maintain a servicing state while the user changes networks until the user deregisters himself (e.g., by turning off the phone).

Protocol-interoperability component 160 translates data transmitted in protocol into that of another in instances where the networks in different domains communicate in disparate protocols in one embodiment. In another embodiment, a standard protocol is used, and all communications are translated according to that selected protocol.

BSS/OSS-interworking component 162 allows for the facilitation of business support services and operational support services.

Figure 2:
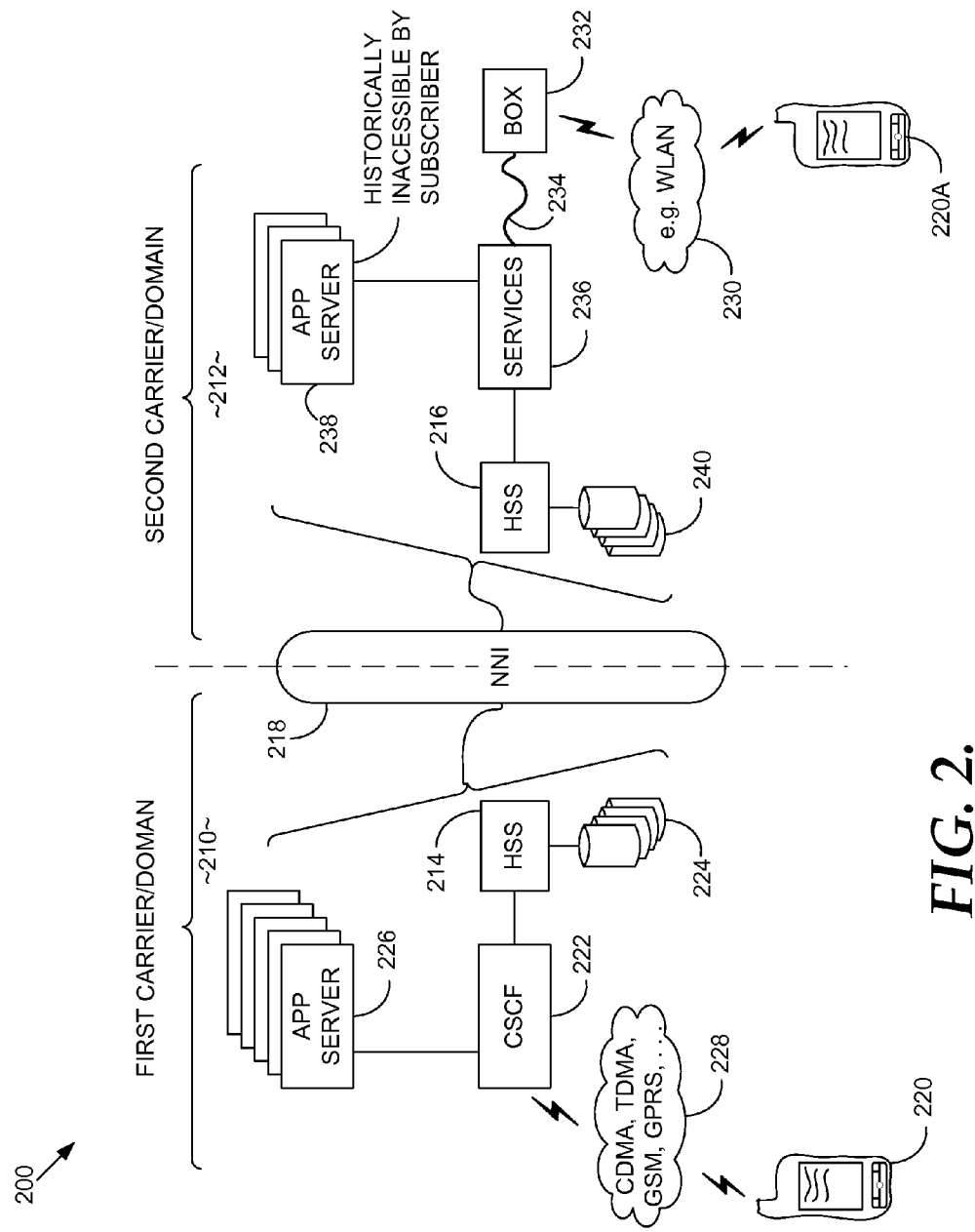
FIGS. 2 and 2A provide another depiction of an illustrative operating environment suitable for practicing an embodiment of the present invention.

Turning now to FIG. 2, another illustrative operating environment suitable for practicing an embodiment of the present invention is provided and referenced generally by the numeral 200. A first carrier or network of a first domain 210 is depicted along with a second currier or network in a second domain 212. Coupled together by a network-to-network interface (NNI) 218, which could be the same as NNI 112 of FIG. 1. First domain 210 may, for example, be a domain associated with a wireless carrier that provides wireless connectivity to such devices as a mobile phone, mobile email device, PDA, etc. (collectively and illustratively represented by device 220). A call session control function (CSCF) component is referenced by the numeral 222. It is coupled to a home subscriber's server (HSS) 214, which provides access to one or more databases 224 that store profile data associated with customers. Profile data stored in database 224 may relate to billing data, preference data, device-type data, and the like.

CSCF 222 is also coupled to one or more application servers 226. Application servers 226 may provide a variety of functions. For example, an illustrative application server may provide voice functionality. That is, the ability to have a voice telephone call between two (or more) entities. Another illustrative application that may be provided by an application server includes facilitating chat sessions. Other illustrative applications that could be provided include text messaging, multimedia messaging, videoconferencing, Internet access, and the like. In one embodiment, device 220 communicates with CSCF 222 via mobile wireless technologies, such as CDMA, TDMA, GSMC, GPRS and the like, illustratively represented by cloud 228.

In another setting, such as when device 220 enters second domain 212, (referenced by numeral 220A for clarity, it is contemplated to be the same device as 220), it communicates via a wireless technology such as a wireless LAN 230 with a box 232. Wireless LAN 230 may operate with a variety of protocols. Demonstrative protocols include variations of the 802.11 format, such as 802.11a, 802.11b, 802.11g, 802.11n, and the like. Box 232 is represented in generic fashion and may actually correspond to multiple constituent devices.

For example, box 232 may be a cable set-top box (or integrated circuitry) equipped with wireless-access-point functionality. Alternatively, box 232 may represent a wireless access point (such as a wireless router) coupled to a cable modem, which, through a portion of cable infrastructure (represented by numeral 234) is coupled to a services provider 236. Services provider, or services interface, 236 is also coupled to a variety of application servers referenced generally by the numeral 238. Historically, these services would have been inaccessible to subscribing device 220. But by virtue of NNI 218, they can be made available to device 220.

Various applications provided by an application server or variation thereof 238 include cable-television (or other content-type) delivery, voice over packet (VOP, e.g., VoIP) communications, and a variety of others. Services provider 238 is coupled to HSS 216 in domain 212, which exposes a set of profiles 240. Thus, in one embodiment, a customer of a cable provider, which may be in domain 212, may have a first profile as one of the profiles maintained in one or more databases 240. That same customer may have an account with a wireless carrier, and thus have profile data stored in one or more databases 224. But by virtue of NNI 218, mobile device 220 can communicate with the profiles stored in databases 240 to determine what type of services associated with second carrier 212 may be permissibly deliverable to device 220.

An HSS to HSS NNI may require strict policies and processes in one embodiment. Appropriate authorization for information to flow between domains will be provided, as explicit profile information may stay within the primary service domain in an embodiment. Users might request that profile information be shared between domains to enable new and/or unique services.

The type of services deliverable may turn on the type of device that 220 is, or the functionality it is capable of providing (such as video rendering, MMS capabilities, etc.) or it may turn on subscribing information. For example, if a person subscribes to a premium tier of cable TV offering, such as premium channels, then such content would be deliverable to device 220. But if the same customer subscribed only to basic cable, then content associated only with those channels may be streamed to device 220. In this way, seamless roaming between first carrier 210 and second carrier 212 would be facilitated by NNI 218.

If users are using a wireless LAN network 230 in their homes, and the cable modem connection for all their cable services, when they go outside the home, NNI 218 can facilitate data communication via CDMA or other mobile phone technology 228 so that the end device 220A continues to receive service uninterrupted. Device 220A becomes one common device for data services, but services can operate with other end devices such as a television and PC (as shown in FIG. 1). A customer would not even know nor need to know which technology is being utilized to effect the current service offering.

NNI 218 facilitates the sharing of information that is required to deliver services across these two environments 210 and 212 such that when a customer is in a certain location and requesting certain services, it can request anything in any domain that it has access to. These services can be managed as the customer moves around.

Figure 2A:
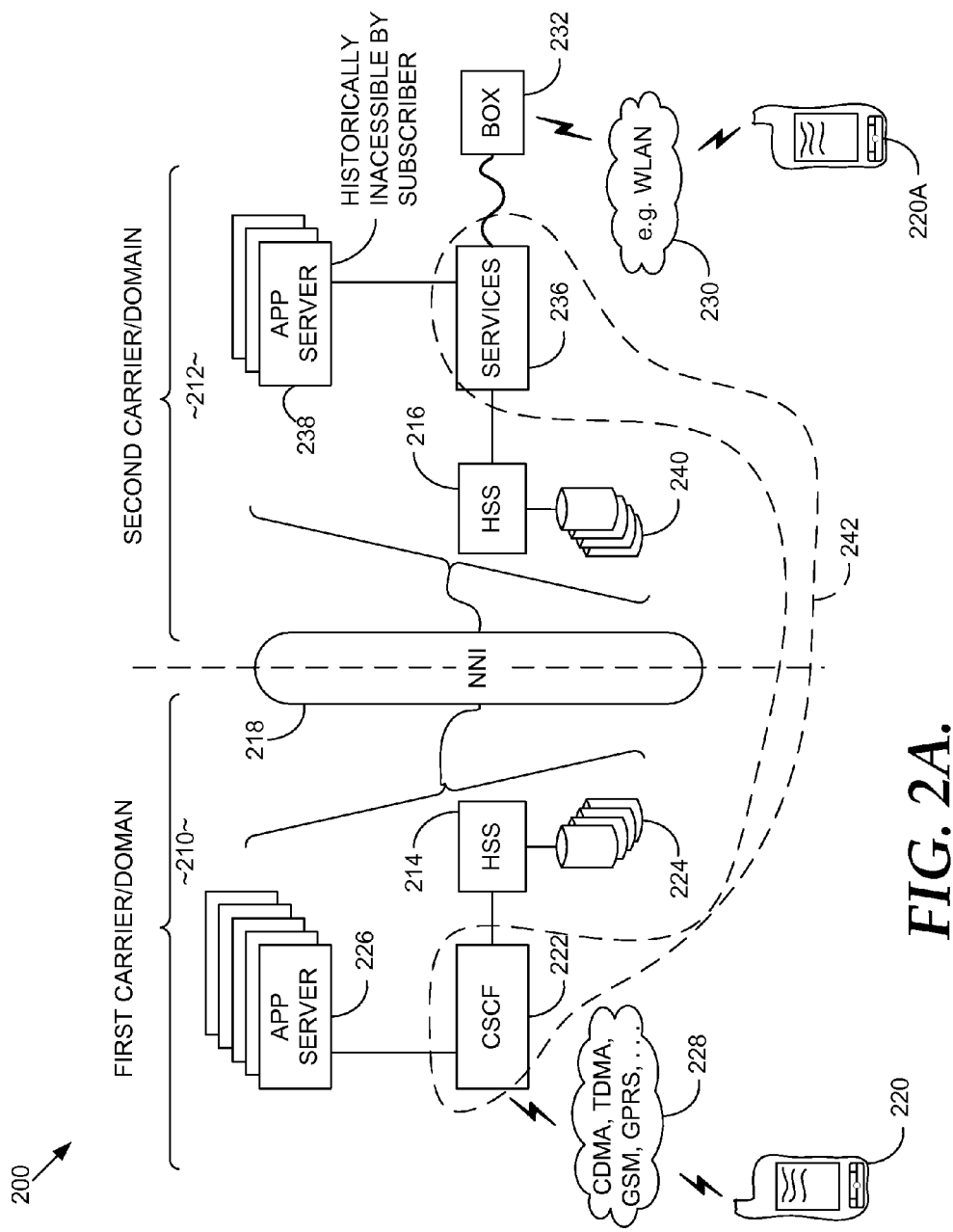

In this cross-domain environment, services from either one of the domains can be delivered anywhere. The architecture allows these two domains to exchange all the information that is necessary. To the customer, and to certain endpoints or other devices, rather than communicating with a respective CSCF 222 or its corresponding counterpart in second domain 212 (which could be another CSCF or equivalent, such as services component 236), both devices are seen as a common device, a situation graphically shown by dashed line 242 in FIG. 2A. Device 220 or 220A would not even know that it is requesting services of one domain versus another, just that it is requesting a certain type of service, and that request would be granted.

Cascading IMS Login

In one embodiment, this aspect of the invention provides a mechanism by which an owner of a first IMS system may allow IMS subscribers connecting though one IMS domain to access services on another (e.g., a remote) IMS domain without additional functionality needing to be added to subscriber equipment. This aspect relates to providing session-control interworking 148. When the subscriber is using connectivity provided by a first entity, the automated cascading IMS login process allows a local Serving-CSCF (S-CSCF) of the first entity to act as a proxy or Interrogating-CSCF/CI-CSCF. The S-CSCF uses information retrieved from the first entity's HSS to login to a second entity's IMS domain. In one embodiment, the session initiation protocol (SIP) is leveraged along with additional RADIUS/DIAMETER parameters. Among other things, this aspect of the invention facilitates the reaching of roaming user access to services on the IMS domain of both the original and roaming service provider's applications and services, thereby allowing simultaneous reachability of IMS services between multiple domains by subscribers.

Figure 3:
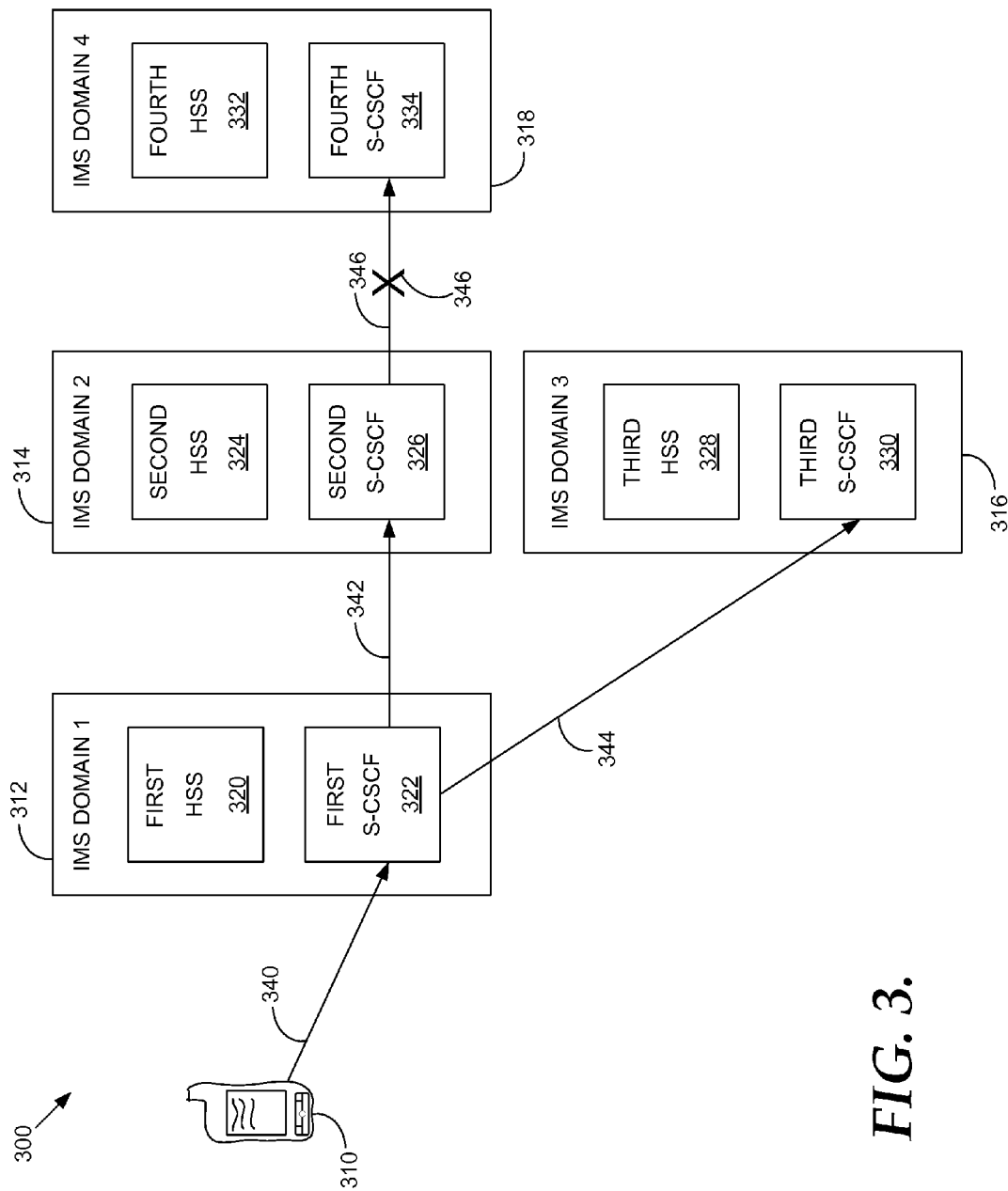
FIG. 3 is a combination block/process diagram depicting an illustrative embodiment for cascading a login process from one domain to other domains according to an embodiment of the present invention.

Turning now to FIG. 3, an illustrative method for allowing an IMS login to be automatically cascaded from a first domain to other domains according to an embodiment of the invention is provided and referenced generally by the numeral 300. To have a login automatically cascaded from a first domain to another or more domains means to substantially make it as though a user had logged into the second or more networks. That is, so that at least a portion (or even all) services that would be available to customers logged in to the second network will also be available to the customers who first logged into a first network, and had such login information utilized to register with the second network.

FIG. 3 depicts a handheld device 310 and also an IMS in a first domain 312, an IMS in a second domain 314, an IMS in a third domain 316, and an IMS in a fourth domain 318. Additional domains could be added of course, but those that are shown are for explanatory purposes and are illustrative in nature. Also shown in their respected domains are first HSS 320 and first S-CSCF 322 associated with first domain 312; second HSS 324 and second S-CSCF 326 associated with second domain 314; third HSS 328 and third S-CSCF 330 associated with third domain 316; and fourth HSS 332 and fourth S-CSCF 334 associated with fourth domain 318.

Out of step 340, handset 310 becomes aware of and starts to facilitate a first IMS registration with first S-CSCF 322 in first domain 312. First domain 312 in this example may be a person's wireless carrier for example. Out of step 342, first S-CSCF 322 in local domain 312 automatically cascades an IMS login to second S-CSCF 326 based on values returned from its local HSS 320.

An illustrative example is indicated by numeral 344, which illustratively shows that any additional IMS logins can be automatically cascaded to any number of domains. For example, first S-CSCF 322 also automatically cascades and facilitates the login process with third S-CSCF 330 in third domain 316 based on the values received from the local HSS 320 in first domain 312.

Though not required, it may be the case that logins may not be cascaded past one level. For example, out of step 346, suppose that S-CSCF 326 attempted to further cascade a login from first domain 312 onto fourth domain 318 by communicating with fourth S-CSCF 334. To the extent this is undesirable, an "X" denoted by reference numeral 346 illustrates that only the S-CSCF 322 in first domain 312 is allowed to perform cascading IMS login. But if such subsequent cascading login was desired, then the same could be allowed. With the IMS logins automatically cascaded down to second domain 314 and third domain 316, device 310 may now access the services associated with the HSS components in the respective domains. Device 310 may access services exposed by HSS 324 and second domain 314 as well as services exposed by HSS 328 and third domain 316. This can be used to share access to profile data stored in profile databases associated with the HSS components or be used to help facilitate services provided by one or more application servers via the respective CSCF in each domain.

Figure 4:
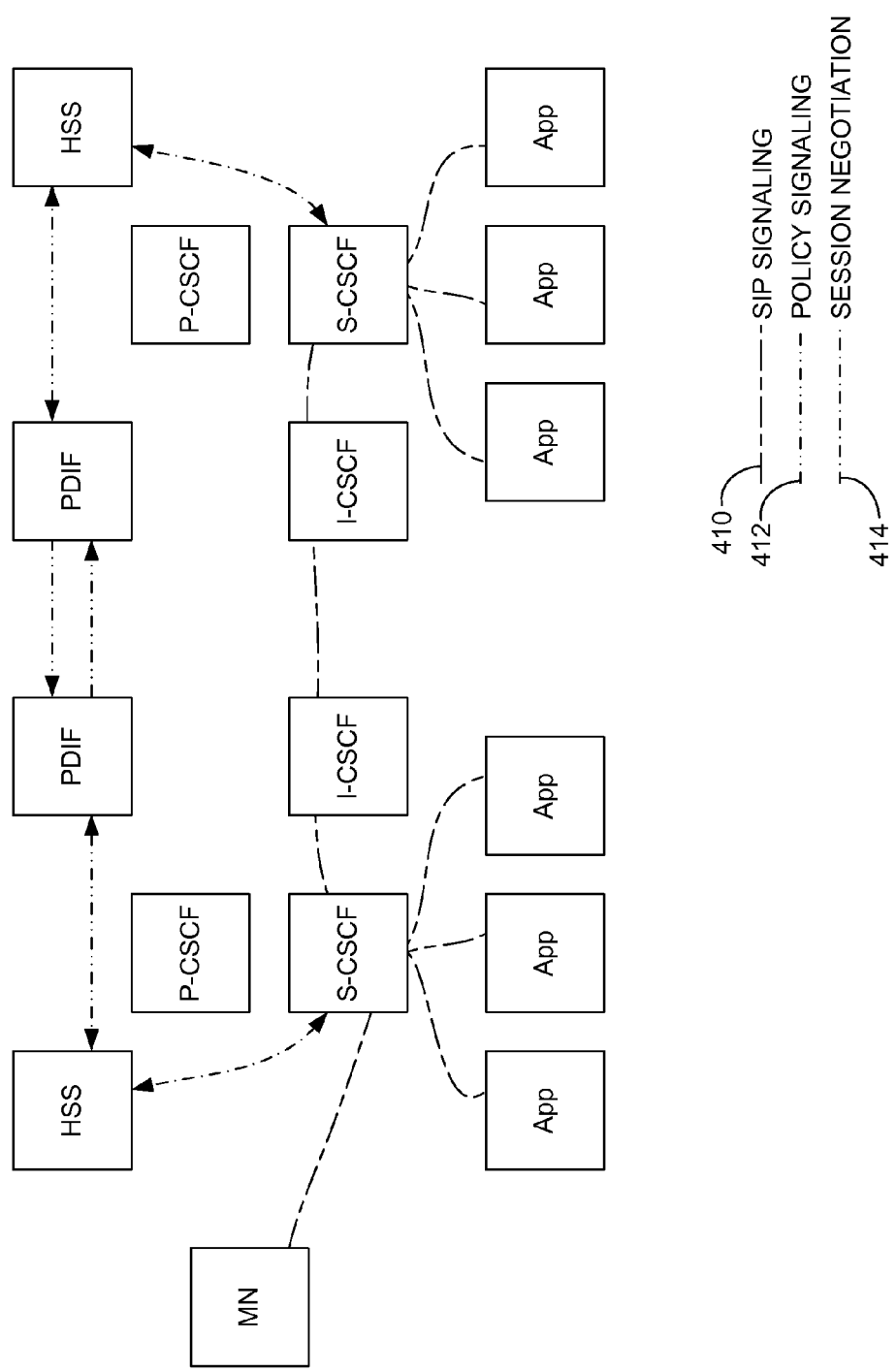
FIG. 4 depicts various illustrative signaling types used to communicate across various elements in connection with facilitating a cascading login process according to an embodiment of the present invention.

FIG. 4 depicts illustrative signaling in an environment where a home S-CSCF is acting as a P-CSCF to facilitate a single-login scenario. As shown, SIP signaling is depicted by a line having the style of that represented by reference numeral 410, policy signaling having format indicated by reference numeral 412, and session-negotiation signaling having a line type as indicated by reference numeral 414. FIG. 4, as with all FIGs, is incorporated by reference into the specification of this patent application and clearly indicates diagrammatically what would take many words to describe, but not necessarily explain in any clearer detail. Similarly, FIG. 4 illustrates but one example of an embodiment that utilizes various kinds of signaling types and/or protocols across various devices. Other types of signaling could be employed to communicate across the various devices shown in FIG. 4, as what is shown is done so to illustrate an aspect of the invention and provide one example of an embodiment that utilizes the various signaling types and protocols shown.

Figure 5:
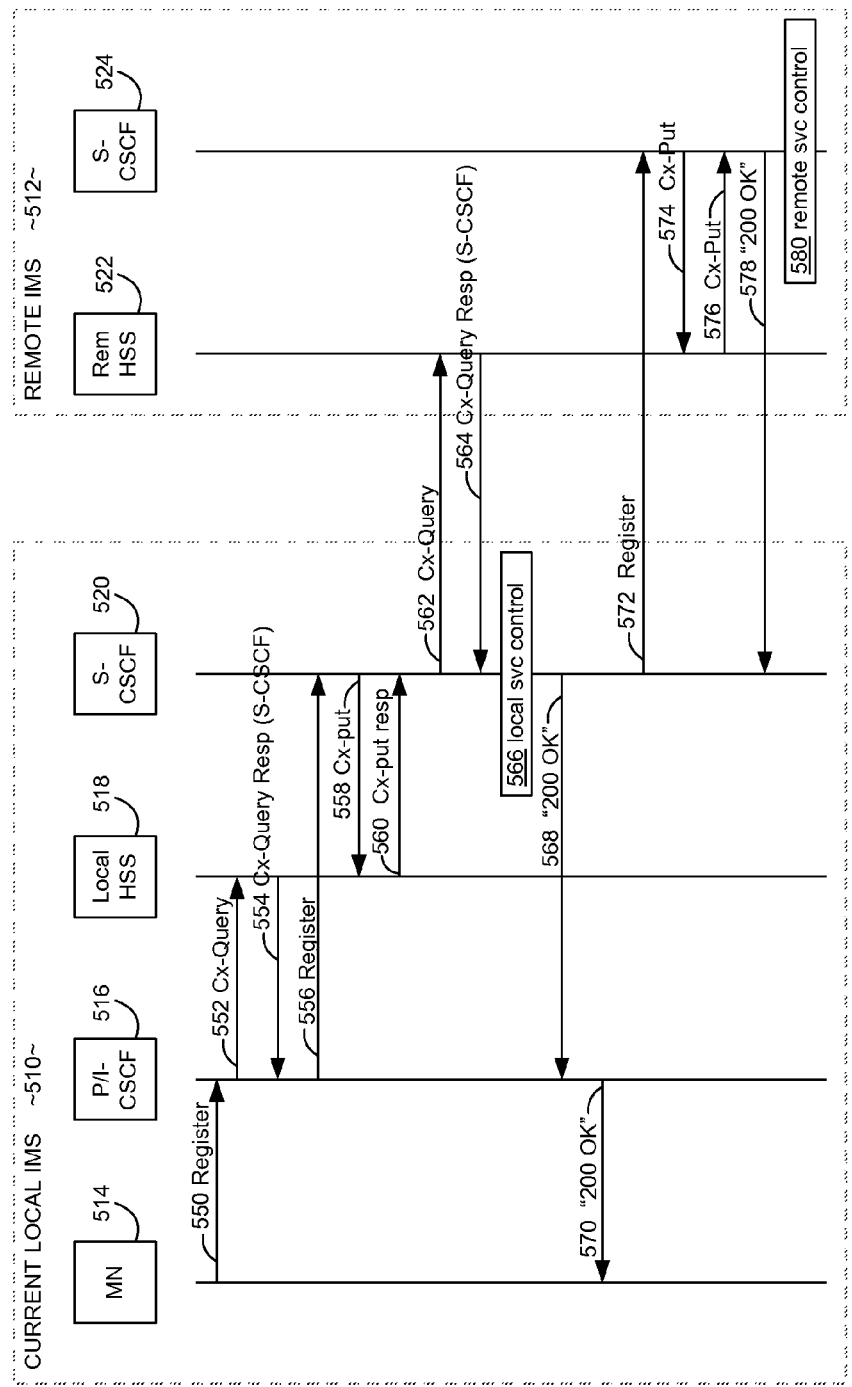
FIG. 5 is a call-flow diagram that depicts illustrative data exchanges that facilitate a cascading log-in process according to an embodiment of the present invention.

Turning now to FIG. 5, a call flow diagram represents illustrative exchanges of information between components in a local IMS 510 (first domain) and components in a remote IMS 512 (second domain). Exemplary devices associated with local IMS domain 510 include a mobile network 514, a P/I-CSCF 516, a local HSS, and an S-CSCF 520. Exemplary devices shown associated with remote IMS domain 512 include a remote HSS 522 and a remote S-CSCF 524.

At a step 550, a handset sends a SIP registration to local P/I-CSCF 516 that may be, for example, resolved through DHCP or other mechanisms. At a step 552, proxy and interrogating CSCF 516 queries for a local serving CSCF from local home subscriber service 518.

At a step 554, local Home Subscriber Server 518 assigns an S-CSCF for this user's session. At a step 556, P/I-CSCF 516 sends a SIP registration to local S-CSCF 520, which facilitates a Cx-put communication to local HSS 518 to obtain subscriber-specific information. S-CSCF 520 requests cascading IMS login information.

At a step 560, local HSS 518 responds with subscriber-session information as well as information supporting a cascading IMS login. Illustrative information supporting a cascading IMS login includes identifying indicia associated with the destination HSS system name (such as a logical name or IP address) to identify information associated with a destination domain that might be private.

At a step 562, S-CSCF 520 of local IMS domain 510 acts as a P/I-CSCF by querying the remote HSS 522 for information relating to target S-CSCF 524 and remote IMS domain 512. At a step 564, remote HSS 522 replies to the query with information describing the target S-CSCF 524. At a step 566, local S-CSCF 520 performs service control, and the subscriber is activated on local IMS domain services.

At a step 568, local S-CSCF 520 sends a SIP "200 OK" message to P/I-CSCF 516 indicating a successful connection to local IMS services. Of course if a different protocol were being used besides SIP, an analogous message could be sent according to the specific protocol employed. At a step 570, the message at the previous step is forwarded on to the IMS client on the local device via mobile network 514.

To facilitate cascading IMS login, local S-CSCF 520 sends a registered message to remote IMS domain 512 on behalf of a mobile device. The register message contains the private user identity IMS system that was supplied to local S-CSCF in step 560 in one embodiment. At a step 574, remote S-CSCF 524 communicates a Cx-put message to remote HSS 522 to gather subscriber-specific information. S-CSCF 524 does not need to request cascading IMS information in one embodiment.

At a step 576, remote HSS 522 replies with the requested subscriber-session information. At a step 578, an 'OK" message is sent by remote S-CSCF 524 to local S-CSCF 520 to facilitate IMS registration on remote IMS domain 510. At a step 580, remote S-CSCF 524 performs remote service control, and the subscriber is activated on remote IMS domain 512, making its services available to a mobile device.

The call-flow steps illustrated in FIG. 5 are not to be construed as exact steps, each of which that need to be performed and/or in a specific order, but is meant to illustrate one example of effecting simultaneous reach ability of IMS services between multiple domains by a wireless subscriber according to an embodiment of the present invention. As mentioned, if different protocols are employed, then different types of messages will be sent, but the overarching act of automatically registering with a remote IMS on behalf of a mobile device will be carried out.

In some embodiments, an alternative to the cascading log-in approach may be desired. We will describe an illustrative alternative in the context of a dynamically assignable CSCF. In a first paradigm, a subscriber's local CSCF is utilized by employing new log-in approaches. But it could also be the case that a person, by way of a handset device, can utilize a local (though not 'home') CSCF associated with a local network other than its home network to be presented with services associated with that local network. "Local" implicates any network that the device can establish a connection with. It may be another carrier's network even when the subscriber is home (and his own home network is accessible), or it may be a network overseas that is the only one (or one of many foreign networks) that the device has access to. By "foreign," we mean to imply "not home," not necessarily "foreign" as people would use it to refer to a foreign country, although it could mean that.

IMS was developed in such a way that it was assumed that subscribers would always be serviced by their home networks. The perceived pervasiveness and ubiquity of IP may have led to the assumption that a customer's home network will generally be available one way or another, and at least available to attempt to access, but not necessarily accessible unless the right security credentials can be provided in the right way. But these suppositions are proving to be less than ideal.

Consider a customer with a home network that services a portion of the United States, or some other country. When that customer is in China, backhauling that customer's request by way of the U.S. network to connect a call to a restaurant across the street from the customer in China is not the most efficient process. Accessing one's home network to utilize services associated with that network is not always the most efficient process to carry out, especially when such service could have been carried out by way of a local carrier's network. That is, assuming that the local network had in place the requisite infrastructure and services to service the desired request. This is becoming more and more of a reality.

In the past, a given network may have offered unique services; that is, either services that are peculiar to that network, or just unique in their own right. For example, maybe a first network offered Instant Messaging (IM) services when no one else did. Or another network offered the ability to send pictures across its network, but in a special way. Given the nature of IMS, many networks can offer the same or substantially similar service offerings as many other networks. And given the rising popularity and utilization of IMS, many networks could offer those services to even noncustomers by utilizing the technologies described herein.

Accordingly, embodiments of the present invention offer several practical applications in the technological arts including allowing a local service provider to service the requests of foreign customers; or alternatively, to allow devices to utilize one or more foreign networks to locally service desired requests (unless those networks cannot, in which case they will be serviced by the home network).

Figure 6:
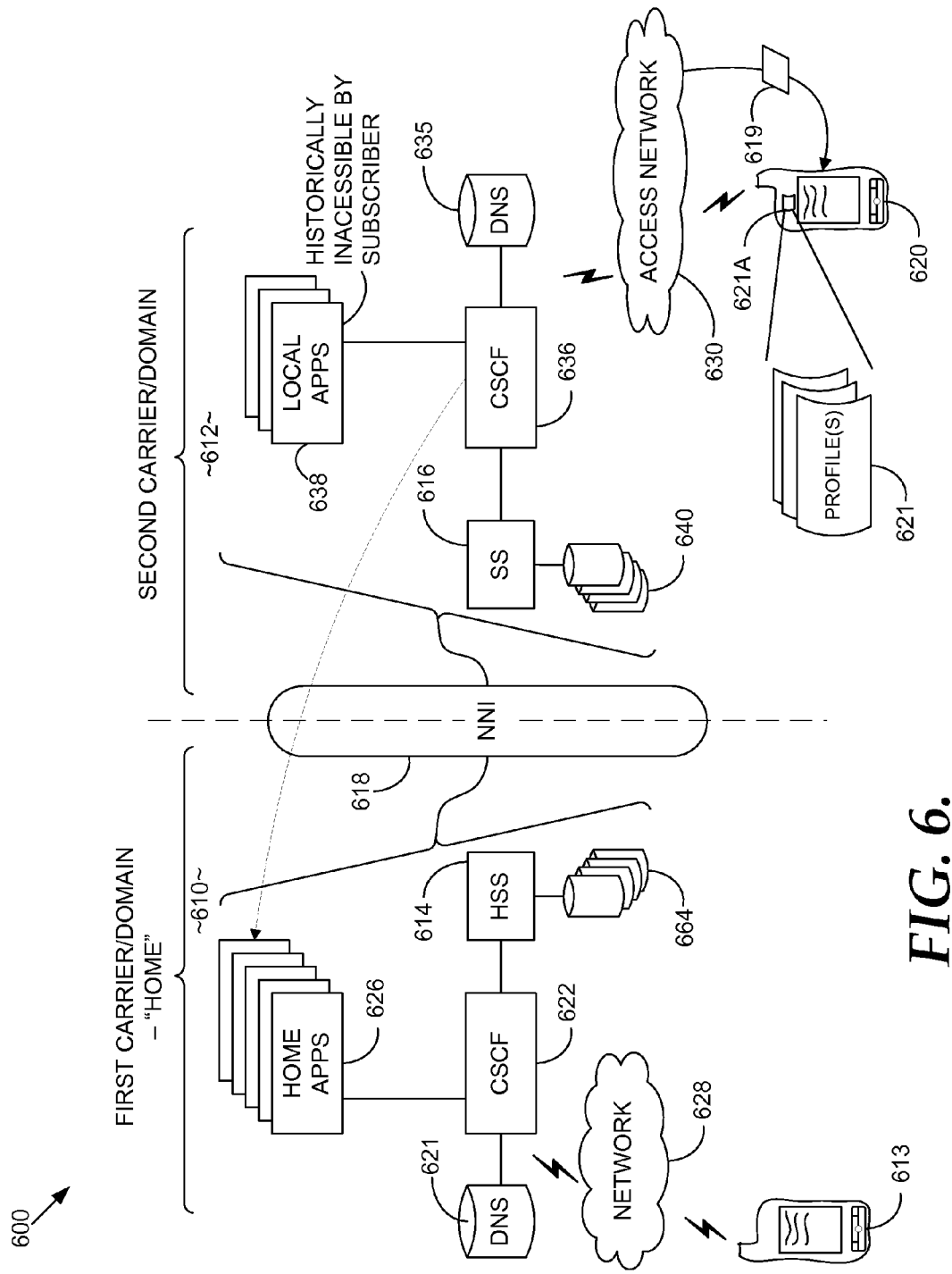
FIG. 6 is another illustrative operating environment suitable for practicing an embodiment of the present invention that allows foreign resources to be utilized directly.

Turning now to FIG. 6, another illustrative operating environment suitable for practicing an embodiment of the present invention is provided and referenced generally by the numeral 600. Operating environment 600 is similar to operating environment 200 of FIG. 2. A first carrier/domain also known as a "home" domain 610 is coupled to a second carrier/domain 612 by way of a network-to-network interface 618. Home domain 610 refers to a domain that normally services device 613 for example. It includes a set of home applications 626 that are accessible by way of CSCF 622, which is coupled to a domain name server 621 and an HSS 614, which is in turn coupled to one or more databases or storage device(s) 664. Although network 628 is shown as a cloud that superficially appears to be separate from the other components in home domain 610, it would be understood by one of ordinary skill in the art that such components actually form part of a network such as network 628. This is also the case in FIGS. 2 and 2A regarding network 228 for example, and various other places in this disclosure.

Second domain 612 includes a set of local applications 638 that, absent an embodiment of the present invention, would normally be inaccessible by handset 613. Handset 613 is differentiated from handset 620 herein for ease of illustration and description, but they can be the same. Handset 620 includes one or more profiles 621 embodied on one more computer readable media 621A within handset 620. As will be explained in greater detail below, profiles 621 store data that can be utilized to provide access to local apps 638 as opposed to having to utilize home applications 626.

Second domain 612 includes a CSCF 636 that is coupled to a domain name server 635 and SS 616, which is coupled to one or more data stores 640.

In one embodiment, an access network such as access network 630 provides access to second domain 612. An illustrative access network may be a localized network such as a WiFi Network. But in other embodiments access network 630 may actually be the network of second domain 612. That is the various components (e.g., local apps 638, CSCF 636, DNS 635) may be included within or part of access network 630. In other embodiments, access network 630 is different from second domain 612 but provides access to the same.

Figure 7:
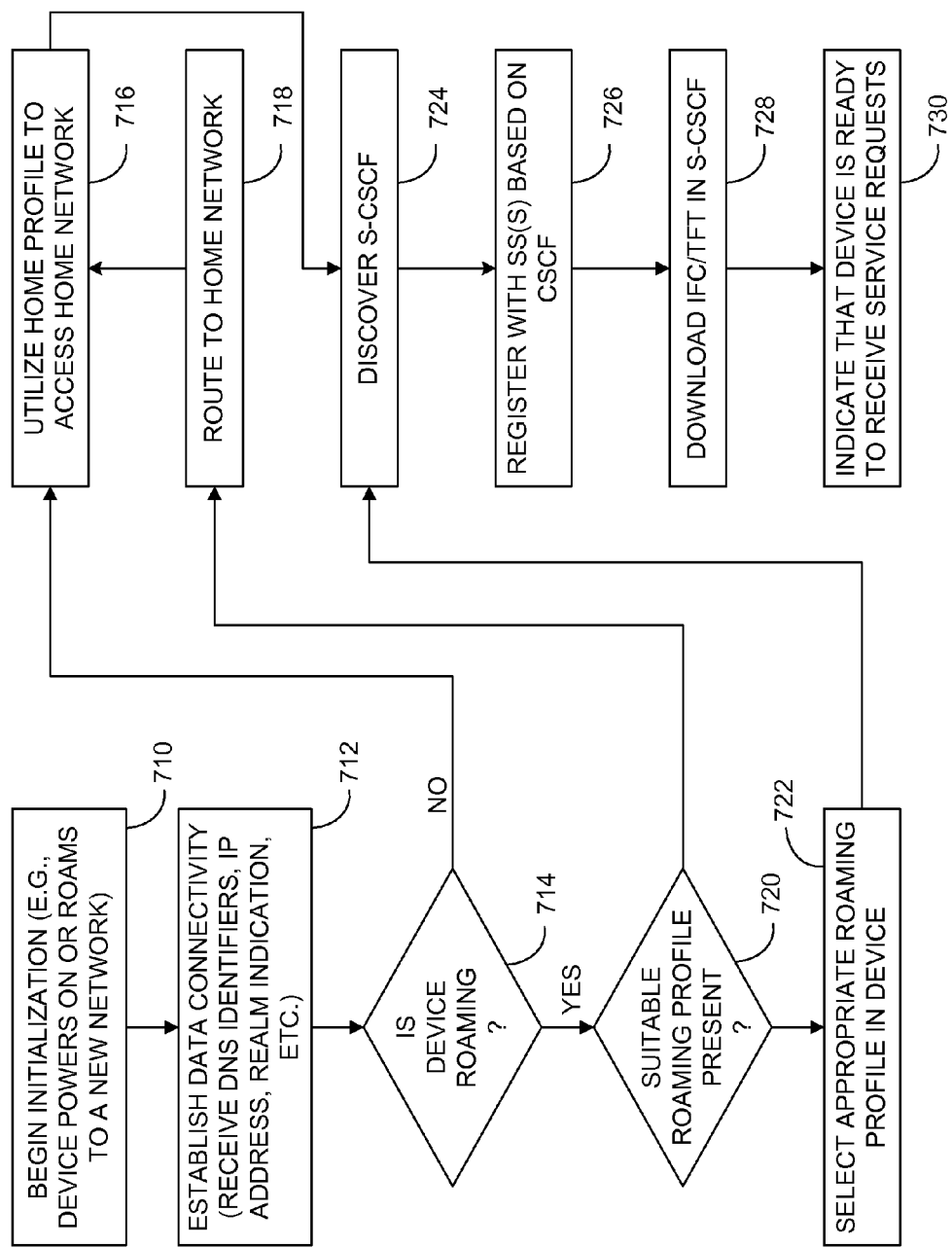
FIG. 7 is a flow chart that depicts an illustrative method of directly utilizing the resources of a foreign network.

Turning now to FIG. 7, an illustrative process for servicing a service request from a communications device that is normally associated with a first domain is provided. At a step 710, an initialization process is begun. Illustrative steps associated with beginning and initialization process include device 620 powering on or roaming to a new network. As device 620 powers on, data connectivity will be established with at least access network 630. Illustrative steps that are included when establishing data connectivity comprise receiving from device 620 DNS identifiers, an IP address associated with device 620, a realm indication (which will be described in greater detail below), etc. In one embodiment device 620 includes a preferred roaming list (PRL) that helps decide what network to connect to if multiple networks are available. By way of step 712, IP connectivity will be established with, for example, second domain 612 even though it may not be logged into at least a portion of second domain 612 (e.g., the IMS portion for example).

Thus, at a step 714, a determination is made as to whether the device is roaming or not. If the device is not roaming, then processing advances to step 716, wherein device 620 utilizes its home profile to access home network 610. The home profile will be one of profiles 621. Thus, communications from device 620 will be routed to home network 610 by way of NNI 618.

But if device 620 is roaming, then a determination is made at step 720 as to whether a suitable roaming profile is present among profiles 621. This determination will be made based on the type of network second domain 612 is. If a suitable roaming profile is present, then it is selected at step 722. As mentioned, this selection is made based on the type of network that second domain 612 is and the type of profiles or data in a single profile 621. For example, second domain 612 may be "chinatelecom.com." If device 620 includes a profile associated with chinatelecom.com, then that profile will be selected at step 722. A business arrangement between the two networks (e.g., 610 and 612) will be in place to allow communication between device 620 and second domain 612.

After the appropriate roaming profile is selected in device 620 according to this embodiment, CSCF 636 is discovered at a step 724. In one embodiment, this includes sending a request to DNS 635 or an IP address associated with the respective CSCF, which in this example is CSCF 636. Recall that at step 712, device 620 received DNS identifiers, which can be used at step 724 to discover CSCF by interrogating DNS 635 to resolve an IP address associated with CSCF.

In one embodiment, the IP address associated with CSCF 636 can be returned. In another embodiment, an IP address can be requested of a fully qualified domain name such as "chinatelecom.com." In an alternative embodiment, an IP address can be requested from the DNS 635 of an unqualified domain name. In such a case, device 620 may not be aware of the specific fully-qualified domain name (FQDM) to request an IP address of. In such a situation, it can respond to a generic request for an IP address associated with CSCF 636. In this case, domain-name server 635 would include the local domain (e.g., "chinatelecom.com"), and respond accordingly. In this way, device 620 does not need to know the precise domain it seeks access to. By virtue of business relationships established between first carrier 610 and second carrier 612, device 620 will have access to local application 638 according to technologies described herein.

At a step 726, device 620 registers with one or more subscriber servers 616 based on the information it received associated with CSCF 636. Subscriber server 616 is similar to HSS 614, except that we do not refer to it as "home" subscriber server to help eliminate confusion that it is a subscriber server in a subscriber's home network such as network 610. Subscriber server 616 denotes which type of applications the user is authorized to use.

In one embodiment, profiles in subscriber server 616 help determine which type of applications device 620 can make use of. In one embodiment, profiles are mapped to realms, such that there is one profile per realm. Subscriber server 616 knows of services that can be offered to device 620 by virtue of N-place roaming agreements. In some embodiments, a generic roaming profile based on a subscription package can be utilized. For example, when device 620 is associated with a given subscriber's plan, certain services are then made available based on the subscriber's user agreement. Based on the type of services that the subscriber wishes to purchase, and thereby associate with device 620, other networks can be notified that certain or all of its services are to be made available to device 620.

Device 620 knows what realms are needed for which services. Thus, it will send a registration message to CSCF 636 based on each of those realms. The CSCF references each realm and logs into the proper HSS (or simply SS). Accordingly, the applicable initial filter criteria (IFC) and traffic filter template (TFT) are downloaded at a step 728. The TFT indicates which applications that the user is authorized to access (or in some cases able to access). This spares the CSCF from having to receive a profile each time communication is established. CSCF 636 will prioritize local servers over home servers if local servers can be utilized to satisfy service requests of device 620. Accordingly, a United States based customer, while in China, can phone a restaurant across the street by utilizing local services without having to have the call routed all the way back to his home network 610 to be fulfilled. At a step 730, an indication may be provide that device 620 is ready to receive service requests.

Turning now to FIGS. 8A and 8B, another aspect of an embodiment of the present invention will be described. This aspect will include the ability to embed multiple (two or more) network access identifiers (NAIs) into a single string. Normally, a single string would have been construed to convey only a single NAI. This aspect helps off load resources from device 620 that would otherwise be necessary to register with devices such as a remote CSCF by enriching the functionality offered by a CSCF to receive a single string, parse that string, and glean from the parsing a level of access to local services that a subscriber can access.

In FIG. 8A, a conventional NAI format 848 is shown that includes a user field 810 and a realm indication 812. We do not mean to imply a strict differentiation between a realm and a domain, but the word "realm" is chosen to help facilitate an easier explanation and not obscure other aspects associated with an embodiment of the present invention. In FIG. 8A, the user field includes "John.Doe" and the realm is "sprint.com."

FIG. 8B depicts an illustrative embodiment of an alternative NAI format, a single string, an NAI string, that includes data capable of identifying multiple NAIs. The alternative NAI format includes a user-identification field 850 as well as a realm indication 852. But user field 850 includes data to identify multiple realms that are delimited by delimiters. By way of example, user field 850 includes the following "##john.doe##alpha.com##beta.com." Of course the selected "##" representation of a delimiter is just that: a representation. The delimiter certainly does not need to be "##." The delimiter may be any value, alpha numeric, character, or otherwise that the implementor wishes. Here, "##" is selected to illustrate a representative place holder and/or actual value of a delimiter.

Mark 850A indicates that the string is embedded NAI format, a multiple-string-format (MSF) indicator. Of course 850A does not need to be "##" or even the same as other delimiters 850C and 850E for example. Mark 850A is merely illustrative. But when CSCF 636 or other components encounter Mark 850A, it knows that string 850 is of an embedded NAI format (although in some embodiments, a multiple-string format may be contemplated, and thus, indicator 850A would not need to be present). Section 850B depicts a first embedded user name, which is separated by realm delimiter 850C from a first embedded realm 850D, which is illustratively shown to be "alpha.com." This portion is separated by realm delimiter 850E from a second embedded realm 850F, which is illustratively shown to be "beta.com." A domain delimiter 850G is illustrative shown as an at symbol "@," but could be something else. Whatever devices parse string 850 will look for the delimiters such as delimiter 850C and delimiter 850E to associate them with embedded user name 850B. In this way, an interpreting device can determine that actually three NAI are embedded in the single format. Here, those three NAIs include "john.doe@alpha.com," "john.doe@beta.com," and "john.doe@sprint.com," which are respectively represented by numerals 852, 854, and 856.

Figure 9:
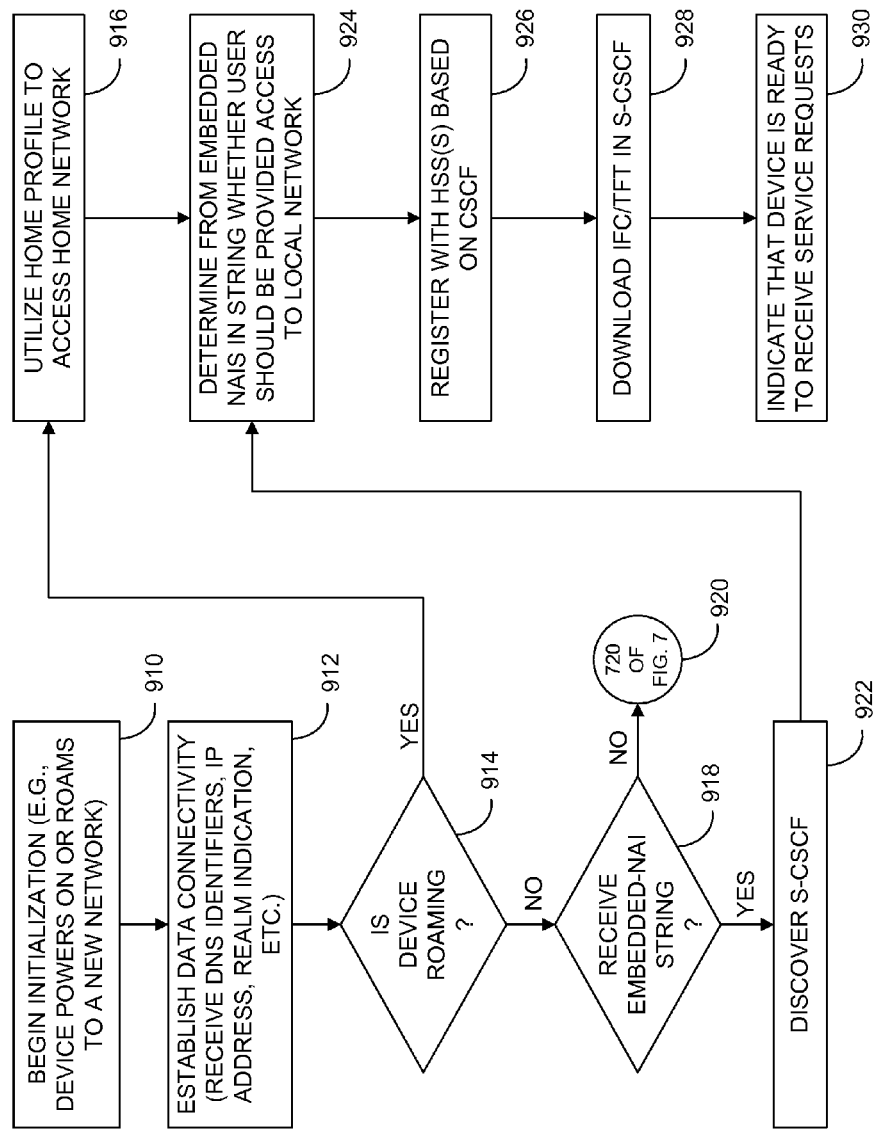
FIG. 9 depicts an illustrative process for extracting multiple NAIs from a single string.

Turning to FIG. 9, a process similar to that of FIG. 7 can be employed to make use of a string having embedded NAIs. At a step 910, an initialization process occurs that is similar to that of step 710, as is the case with steps 912 and 914. If a device is roaming, then a home profile is used to access a home network at a step 916.

At a step 918, a determination is made as to whether an embedded-NAI string is received. As mentioned, this determination can be made by sensing the presence of an NAI-format indicator 850A. If such an indicator is not present, then processing can advance as though it would if processing were to advance to step 720 of FIG. 7, as indicated by numeral 920. But if indicator 850A is present, then processing can advance to a step 922 wherein a local CSCF is discovered as previously mentioned and described.

At a step 924, the CSCF discovered in step 922 can determine from the NAIs embedded in string 850 whether device 620 should be provided access to local network 612, and the various resources associated therewith. In one embodiment, this is accomplished by CSCF 636 extracting the multiple NAIs from string 850. In one embodiment this is accomplished by parsing string 850 and associating embedded name 850B with each respective realm that is delimited by delimiters such as first realm delimiter 850C and second realm delimiter 850E. The fruit of this analysis will be information that indicates a given user is associated with however many domains or realms are encoded in string 850. For example, FIG. 8B lists three realms that John Doe is associated with: "alpha.com, "beta.com," and "sprint.com." However many realms are desired to be embedded in string 850 can be embedded in string 850. If a user is found to include a realm associated with or that includes permission to be associated with second domain 612, then the various local application 638 can be made available to device 620.

After the embedded NAIs are determined, processing advances to a step 926, wherein device 620 is registered with one or more subscriber servers 616 as previously described. Similarly, the IFC/TFT are downloaded at a step 928 as previously described, and an indication may be provided at a step 930 to device 620 that the device is ready to receive service requests.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-executable instructions embodied thereon that, when executed, perform a method of embedding multiple network-access identifiers (NAIs) into a single string for servicing a service request from a mobile device that is normally associated with a first domain, the method comprising:
   receiving a request, at a second domain, from the mobile device to establish data connectivity with an IMS (Internet protocol multimedia subsystem) network associated with the second domain;
   receiving a multiple-string format indicator, at the second domain, that indicates that a string includes data that, when ultimately deconstructed, indicate multiple NAIs (network-access identifiers);
   receiving the string that includes multiple embedded NAIs in a multiple-string format, the multiple-string format including a username and at least one domain identifier separated by one or more delimiters;
   parsing the string to identify the multiple embedded NAIs;
   identifying at least one of the multiple embedded NAIs as being associated with the second domain;
   discovering an S-CSCF (serving call session control function) in the IMS network associated with the second domain; and
   registering the mobile device with a subscriber server associated with the second domain, the subscriber server including a profile that indicates a set of services available to the device from the second domain.

2. The media of claim 1, wherein the string includes:
   a multiple-string format (MSF) indicator that indicates that an instant string includes data that, when ultimately deconstructed, indicate multiple NAIs;
   the username;
   a first domain delimiter that indicates a presence of a first domain associated with the username;
   a first domain indicator associated with the username;
   a second domain delimiter that indicates the presence of a second domain associated with the username; and
   a second domain indicator that is associated with the username.

3. The media of claim 2, further comprising: constructing a first embedded NAI by concatenating the username, a chosen delimiter, and one of the first and second domain indicators.

4. The media of claim 1, wherein receiving the request, at the second domain, from the mobile device further comprises:
   dynamically assigning the S-CSCF associated with the second domain to receive service requests from the mobile device in the IMS network; and
   receiving the requests by way of the dynamically assigned S-CSCF.

5. The media of claim 4, further comprising: servicing the request by utilizing at least the dynamically assigned S-CSCF.

6. The media of claim 5, wherein servicing the request further comprises:
   determining that the request cannot be serviced by the dynamically assigned S-CSCF;
   identifying a second S-CSCF is capable of servicing the request; and
   directing the request to the second S-CSCF.

7. The media of claim 1, wherein discovering the S-CSCF comprises:
   receiving a request for an IP address of the S-CSCF at a domain name server (DNS) in one of an unqualified domain name format or a fully qualified domain name format, wherein the unqualified domain name format does not include an express indication of a certain domain and the fully qualified domain name format does include an express indication of a certain domain; and
   providing an IP address of a local S-CSCF.

8. The media of claim 1, further comprising: automatically registering the mobile device with one or more second subscriber servers associated with one or more of the first domain and one or more third domains such that at least a portion of the services that are available to users that are properly registered with the first or third domains are available to the mobile device.

9. The media of claim 8, further comprising: registering the mobile device by using the information contained in the profile included on the subscriber server.

10. The media of claim 8, further comprising: registering the mobile device by using one or more of the multiple embedded NAIs.

11. The media of claim 8, wherein the S-CSCF of the second domain controls the services provided by the first domain and the one or more third domains.

12. The media of claim 11, wherein the services provided by the second domain, first domain, and one or more third domains are simultaneously reachable.

13. The media of claim 8, wherein one or more of the third domains includes a cable network configured to communicate television programming.

14. The media of claim 1, wherein the first domain facilitates mobile wireless communications.

15. One or more non-transitory computer-readable storage media having computer-executable instructions embodied thereon that, when executed, perform a method of embedding multiple network-access identifiers (NAIs) into a single string for sharing data across networks in different domains, the method comprising:
   receiving a request for services of a cable-television-services domain from a requesting mobile device by way of a first IMS (IP multimedia subsystem) network environment in a first domain;

receiving an indication, at the cable-television-services domain, that a string includes data that indicates multiple NAIs (network-access identifiers);
receiving the string that includes multiple embedded NAIs in a multiple-string format, the multiple-string format including a multiple-string format indicator, a username, and at least one domain identifier separated by one or more delimiters, wherein the first domain is a wireless-communications-services domain;
parsing the string to identify the multiple embedded NAIs;
identifying at least one of the multiple embedded NAIs as being associated with the cable-television-services domain;
discovering an S-CSCF (serving call session control function) in the IMS network associated with the cable-television-services domain; and
registering the mobile device with the S-CSCF associated with the cable-television-services domain, the S-CSCF including an associated subscriber server that includes a profile that indicates a set of services available to the device from the cable-television-services domain;

determining that the request requires one or more services in the set of services available from the cable-television-services domain;
retrieving data associated with the one or more services from the cable-television-services domain;
communicating the retrieved data to the mobile device by way of a session in the first IMS network environment;
determining that the mobile device has moved from the first IMS network environment to a third network; and
communicating the retrieved information by way of the third network to the requesting device.

16. The media of claim 15, wherein the session is switched from the first network to the third network during an idle state.

17. The media of claim 15, wherein the request is for television-type programming to be delivered to the mobile device.

18. The media of claim 15, wherein the first network is a foreign network to the mobile device.

* * * * *